Figure 1:
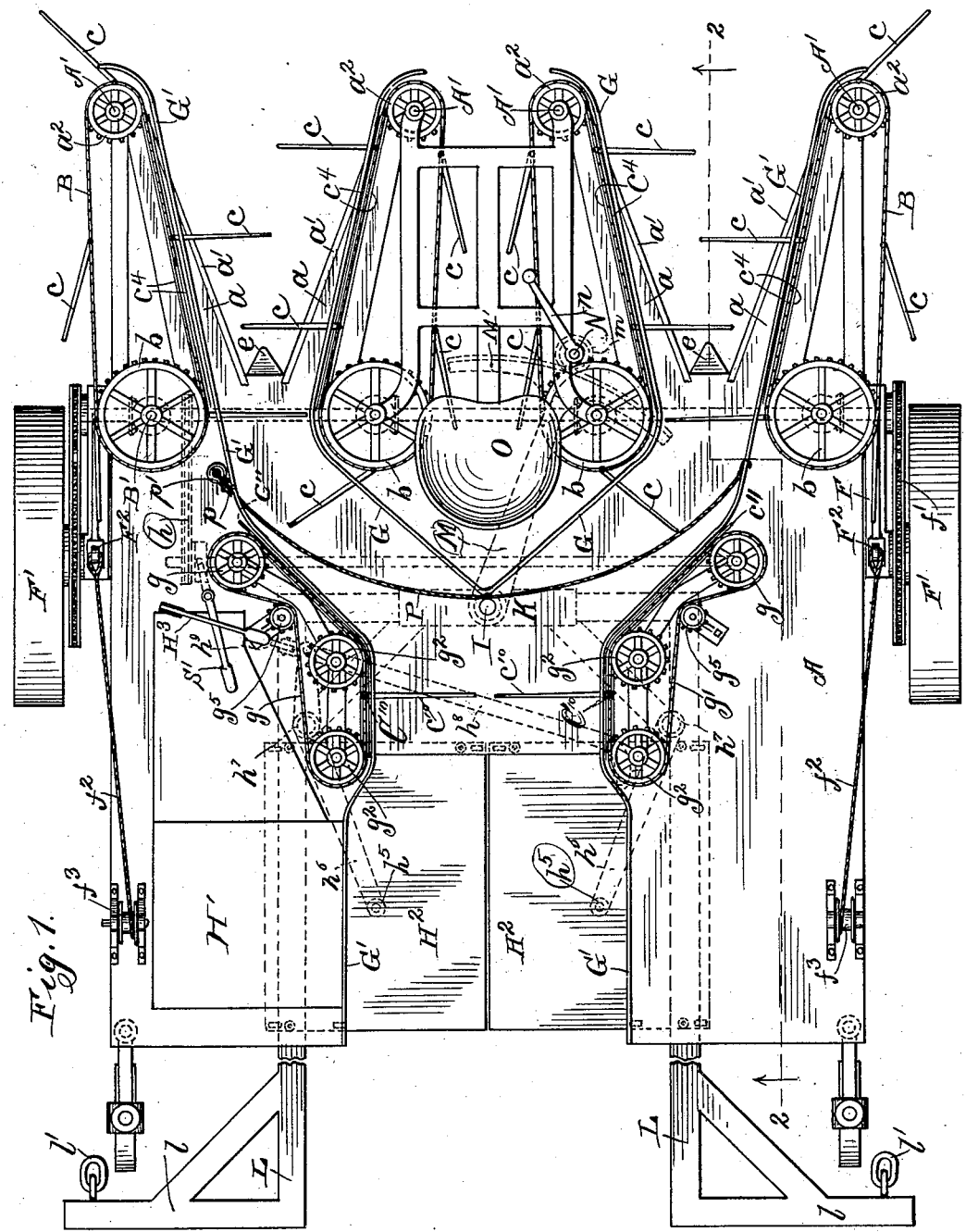

No. 607,112.

A. J. CROPP.
CORN CUTTER AND SHOCKER.
(Application filed Mar. 20, 1897.)

Patented July 12, 1898.

(No Model.)

3 Sheets—Sheet 1.

Witnesses
W. J. Jacker.
E. A. Duggan.

Inventor:
Andrew J. Cropp
By Chas. C. Tillman
Atty.

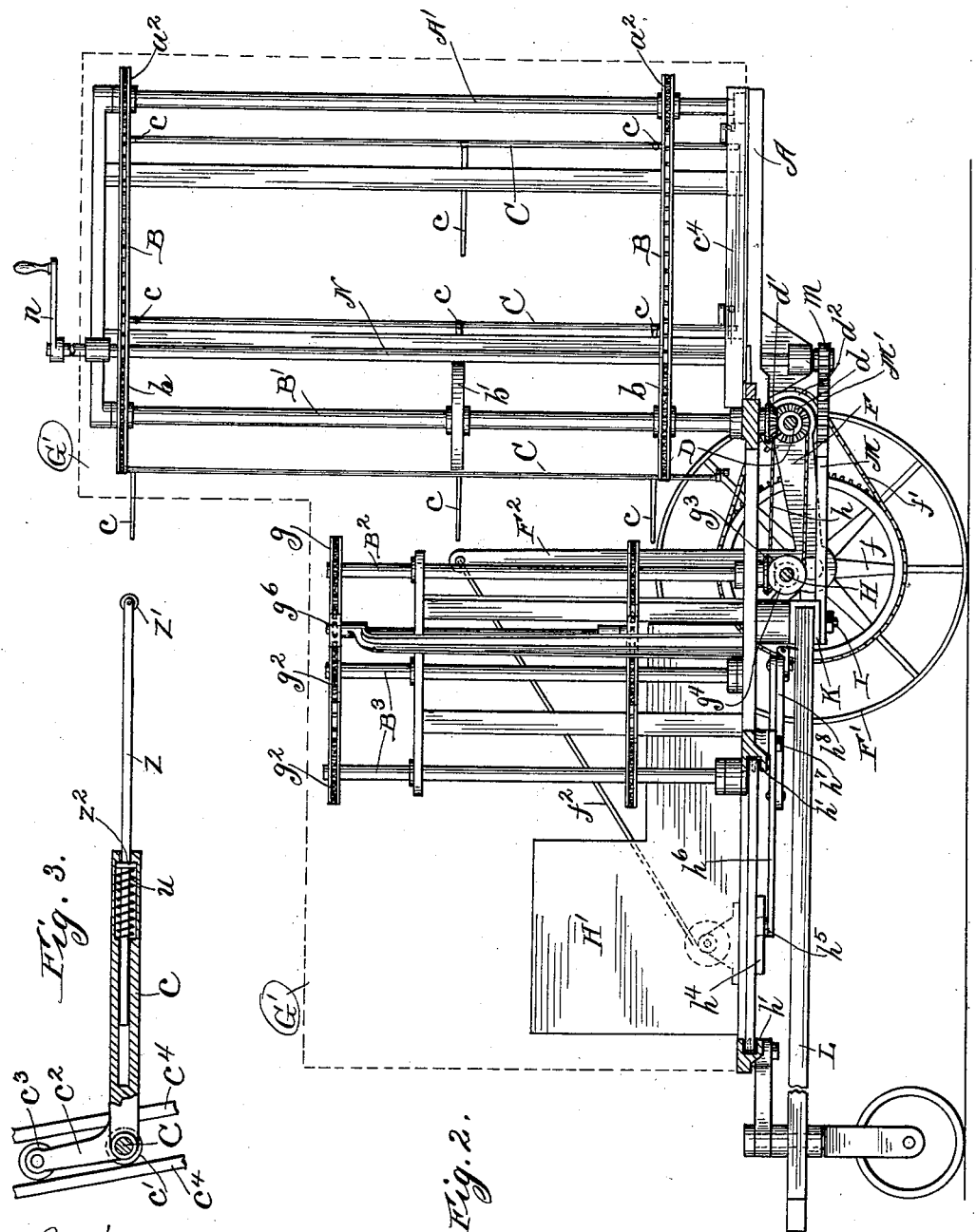

No. 607,112. Patented July 12, 1898.
A. J. CROPP.
CORN CUTTER AND SHOCKER.
(Application filed Mar. 20, 1897.)
(No Model.) 3 Sheets—Sheet 3.
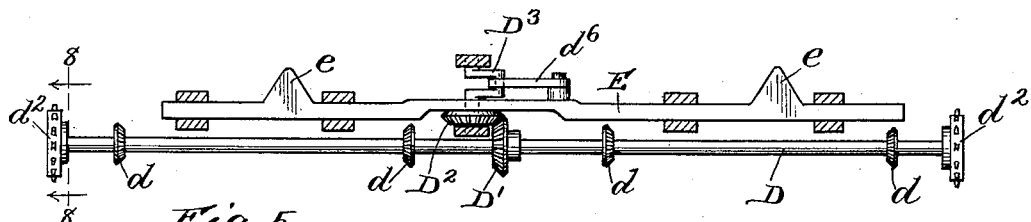
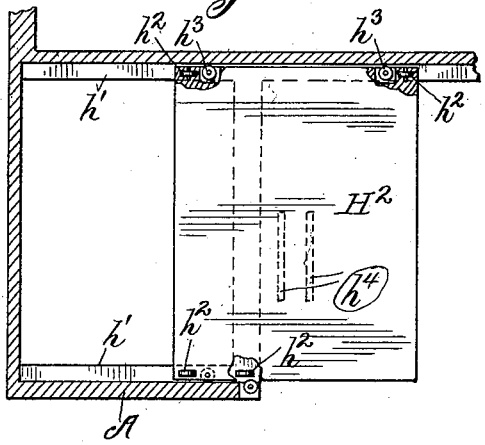
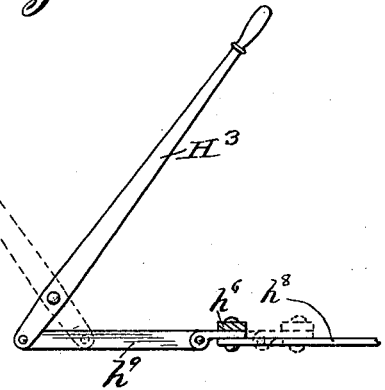
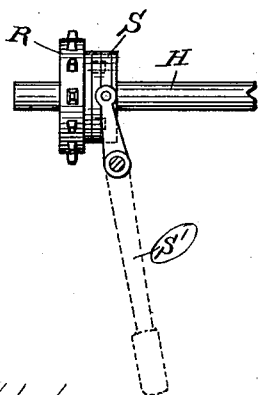
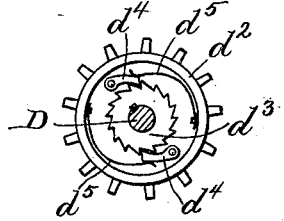
Witnesses:
W. J. Jacker.
E. A. Duggan.
Inventor:
Andrew J. Cropp
By Chas. C. Tillman
Atty.

UNITED STATES PATENT OFFICE.

ANDREW J. CROPP, OF CHICAGO, ILLINOIS.

CORN CUTTER AND SHOCKER.

SPECIFICATION forming part of Letters Patent No. 607,112, dated July 12, 1898.

Application filed March 20, 1897. Serial No. 628,407. (No model.)

*To all whom it may concern:*

Be it known that I, ANDREW J. CROPP, a citizen of the United States, residing at Chicago, in the county of Cook and State of Illinois, have invented certain new and useful Improvements in Corn Cutters and Shockers, of which the following is a specification.

This invention relates to improvements in that class of stalk cutting and shocking machines which are mounted on wheels, and while it is more especially designed to be used for cutting and shocking the stalks of maize, commonly called "corn," yet it may be employed for cutting and shocking such products as ensilage, sugar-corn, broom-corn, and the like, which are usually planted and grow in rows; and it consists in certain peculiarities of the construction, novel arrangement, and operation of the various parts thereof, as will be hereinafter more fully set forth and specifically claimed.

The principal objects of my invention and the main features of the improvements relate to the mechanism for carrying back the cornstalks from the cutter to the rear of the machine and to the mechanism for laterally operating the sliding platforms, so as to deposit the shock on the ground in an upright position.

Other objects and advantages will appear in the following description.

In order to enable others skilled in the art to which my invention pertains to make and use the same, I will now proceed to describe it, referring to the accompanying drawings, in which—

Figure 1 is a plan view of the machine, showing the poles to which the horses may be hitched for driving the machine shortened for the convenience of illustration. Fig. 2 is a view, partly in elevation and partly in section, taken on line 2 2 of Fig. 1. Fig. 3 is a detail view, partly in section, of one of the fingers, the supporting-rod therefor, and a part of one of the guides for said supporting-rod. Fig. 4 is a plan view, partly in section, showing the cutting-bar and the main driving-shaft. Fig. 5 is a horizontal sectional view of a portion of the rear part of the main frame, showing the manner of securing one portion of the movable platform therein. Fig. 6 is a detail view of the lever used for operating the sliding platforms. Fig. 7 is a detail plan view, partly in section, of an auxiliary driving-shaft, a sprocket-wheel thereon, and a clutch for engaging said wheel; and Fig. 8 is a sectional view taken on line 8 8 of Fig. 4, showing one of the ratchet-wheels on the main driving-shaft.

Similar letters refer to like parts throughout the different views of the drawings.

A represents the main frame, upon which is mounted the various parts of the machine, which is rectangular in its general outlines. The front part of the frame is provided with forwardly and diverging portions $a$ to form V-shaped guideways for the rows of corn. Each of these portions is provided in its adjacent surface with a blade $a'$ to be used for cutting the stalks. Vertically journaled in suitable bearings on the upper part of the extensions $a$ are a series of shafts $A'$, each of which is provided near its top and bottom with a sprocket-wheel $a^2$, around which passes a sprocket-chain B, which also engages the sprocket-wheels $b$, located on the vertical shafts $B'$, journaled in suitable bearings on the main frame A near the inner portions of the guideways formed by the extensions $a$. Each of the vertical shafts $B'$ has rigidly secured thereon near its middle a wheel $b'$, used as braces for the rods C, which carry the fingers $c$, and which rods may be of any desired number and are pivotally secured at proper distances apart in the chains B, which, as before stated, engage the sprocket-wheels $a^2$ and $b$ on their respective shafts. The lower end of each of the rods C, on which the fingers $c$ are rigidly secured, is provided with a roller $c'$ and an arm or extension $c^2$, which is also provided at its free end with a roller $c^3$, which, as well as the roller $c'$, operate in the guideways formed by the parallel rails $c^4$, which are located on the extensions $a$ near the blades $a'$, as is shown in Fig. 1 of the drawings. Journaled in suitable bearings on the main frame is the main driving-shaft D, on which is mounted at proper points a number of beveled gears $d$, which engage with similar gears $d'$ on the lower ends of the shafts $B'$. On each end of the driving-shaft D is loosely mounted a sprocket-wheel $d^2$, each of which is provided with a ratchet-wheel $d^3$, keyed to the shaft, and which when the machine is driven forward engage pawls $d^4$, which are normally held in contact therewith by means of springs $d^5$, secured to the sprocket-wheels. On the middle of the driving-shaft D is mounted a beveled gear D', which engages a similar gear $D^2$ on the lower end of the crank-shaft $D^3$, which is journaled on the main frame and is connected to the cutting-bar E by means of a pitman $d^6$, so that in the revolution of the main driving-shaft the driving-bar will be given a reciprocating movement, thus causing the knives or blades $e$ thereof to act in conjunction with the blades $a'$ and to cut the stalks. Secured on the driving-shaft near each of its ends are rearwardly-extending hangers F, on the rear portion of each of which are journaled the traction-wheels F', each of which has rigidly connected thereto a sprocket-wheel $f$, around which and the wheels $d^2$ pass the sprocket-chains $f'$, thereby imparting motion to the driving-shaft.

The rear portion of each of the hangers F is formed or provided with an upright standard $F^2$, to which is secured one end of a cord $f^2$, the other end of which is secured to a drum $f^3$, suitably mounted on the rear portion of the main frame. By winding the cords on the said drums it is evident that the upper ends of the standards $F^2$ will be drawn rearwardly, which will raise the front part of the machine, and by unwinding said cords the front portion of the machine may be lowered, as is apparent. The sprocket-wheels $a^2$ and $b$ are arranged in pairs, as shown, and the sides and rear portion of the inner pairs of said wheels are protected by means of a shield or wall G, made of sheet metal or other suitable material, while the side pairs of said wheels are protected by shields G', which extend to the rear of the platform. The shields G and G' are slotted at suitable points to allow of the movement of the fingers, and not only form a protection for the wheels, but also act as guides for the stalks after they have been cut. Vertically journaled on the main frame and at some distance to the rear of the shafts B' and on the outside of the shields G' are shafts $B^2$, which are provided near their upper and lower ends with sprocket-wheels $g$, around which are passed chains $g'$, which engage other sprocket-wheels $g^2$ on the shafts $B^3$, vertically journaled to the rear and inwardly from the shafts $B^2$, the lower ends of the latter-named shafts each being provided with the beveled gear $g^3$ to mesh with similar gears $g^4$ on the auxiliary shaft H, which is journaled on the main frame and geared to the driving-shaft by means of a chain $h$, passing over suitable sprocket-wheels on each of said shafts. The chains $g'$ engage idlers $g^5$, which are mounted on suitable shafts $g^6$, suitably journaled outwardly from the said chains. Each of the chains $g'$ is provided with a rod $C^{10}$, having a number of fingers $c^{10}$ of a like construction as those used on the chains B in the front part of the machine. The lower ends of said rods are provided with rollers, as before, which operate between the rails $c^{11}$ to bring the fingers into action when required. The rear portion of one side of the frame is provided with a step-like platform H', upon which the operator may stand when tying the shock of corn.

By reference to Figs. 1, 2, and 5 of the drawings it will be seen that the rear central portion of the main frame is divided and is provided with horizontal grooves $h'$ for the operation and reception of the sections $H^2$ of the sliding platform. Each of these sections is provided at its front and rear edges with rollers $h^2$ and $h^3$, the former of which are horizontally journaled and the latter vertically journaled, so that they will contact with the bottom and sides of the grooves $h'$ in the main frame. On the bottom of each of the sections $H^2$ of the sliding platform are secured rails $h^4$, which form tracks for the rollers $h^5$ on the free ends of the bars $h^6$, which are secured on pivots $h^7$ on the lower surface of the main frame and are connected to a bar $h^8$, to one end of which is pivotally secured a bar $h^9$, to which is secured a lever $H^3$, which is fulcrumed on the main frame, and by the raising and lowering of which the sections $H^2$, forming the sliding platform, may be separated or brought together, as desired. Pivotally secured on a bolt I, located about the center of the main frame, is a socket-piece K, to the ends of which are secured the front ends of the poles L, which extend rearwardly, each having a lateral projection $l$, to which may be secured, by means of links $l'$ or otherwise, the singletrees, to which the horses used for driving the machine may be hitched. Rigidly secured to the piece K and extending forward therefrom is an arm M, having on its free end a segment-gear M', which meshes with a pinion $m$ on the lower end of the steering-shaft N, which is vertically journaled and is provided at its upper end with a crank-handle $n$ to be used for turning said shaft when it is desired to guide the machine, which may be done by the operator, a seat O for whom is located and suitably supported at a proper point on the upper surface of the main frame.

In Fig. 3 of the drawings I have shown in detail the construction of one of the fingers used in the mechanism for carrying back the corn and also the manner of securing said fingers and roller-arms with respect to one another on the vertical rods. It will be seen by reference to said figure that the finger $c$ is hollow and is provided near its outer portion with a spring $u$, which encircles the rod $z$, whose free end is provided with a roller $z'$, and about whose middle is located an annular enlargement $z^2$, against which the spring $u$ rests, and which enlargement also prevents the outward removal of the rod. This construction furnishes a finger of a yielding nature which will be found advantageous when the stalks are crowded in the guideways. The arms $c^2$ on the rods C and $C^{10}$ are fixed, as shown, at an angle to the fingers, and as the rods are pivotally secured in the chains B and $g'$, respectively, the fingers will drop out of action after the rollers have passed through the guideways formed by the rails $c^{11}$, and will so remain until the rollers again enter said guideways. I may use fingers composed one piece, however, instead of the construction shown in Fig. 3 and above described without departing from the spirit of my invention.

In Fig. 7 of the drawings I have shown a detail view of a portion of the auxiliary shaft H, on which is mounted a sprocket-wheel R, which is geared to the driving-shaft by means of a suitable chain passing over a sprocket-wheel thereon, and in this figure I have illustrated a clutch S of the ordinary construction, which may be thrown into engagement with the wheel R by means of a foot-lever S', fulcrumed on the main frame, as seen in Fig. 1 of the drawings.

From the foregoing and by reference to the drawings it will be seen and clearly understood that by attaching the horses to the poles L the machine will be driven in front of them and that the flaring guideways formed by the extensions $a$ will each stride a row of cornstalks, which when brought in contact with the blades $a'$ and $e$ will be severed, the fingers $c$ serving to hold them in an upright position and to push them backwardly in the guideways formed by the walls G and G', where they will be supported by means of the cord P, which is secured at one of its ends to one of the walls G' and passes over a pulley $p$ on the other wall G' and is provided at its free end with a weight $p'$, which will hold it against the corn, but will allow it to yield so that the stalks may be crowded rearwardly. When a sufficient amount of stalks shall have been cut and collected at about the rear of the wall G, the cord P may be removed therefrom, when by shifting the clutch S by means of the foot-lever S' the shaft H may be brought into gear with the driving-shaft, which will cause the chains $g'$, carrying the rods $C^{10}$ and fingers $c^{10}$, to travel on their respective sprocket-wheels until said fingers are brought into action by reason of the grooves formed by the rails $c^{11}$, when said fingers will contact with the bunched stalks and push them onto the sections $H^2$, forming the sliding platforms, where they may be bound near their tops to form a shock, while other stalks are being cut and collected at the rear of the wall G. After being so bound the platforms may be slid from under the shock or bunched stalks by means of the lever and its connections with said sections, thus causing the shock to be deposited on the ground in an upright position. It will be understood that the fingers $c$ and $c^{10}$ on the rods C and $C^{10}$, carried by the chains B and $g'$, respectively, will be brought into action or at substantially right angles to the chains at the proper time through the medium of the rollers $c^3$, arms $c^2$, and the track or grooves formed by the rails $c^4$ and $c^{11}$, which are located as above set forth. It is also apparent that the mechanism for carrying back the stalks is so geared that the fingers will move rearwardly at the same rate of speed as the machine travels in a forward direction.

Having thus fully described my invention, what I claim as new, and desire to secure by Letters Patent, is—

1. The combination with a wheeled main frame provided with a stalk-cutting mechanism, of a driving-shaft journaled on the main frame, rearwardly-extending hangers for the traction-wheels, secured on the driving-shaft near its ends, upright standards on the rear portion of said hangers and means to incline said standards, a series of vertical shafts B', journaled on the main frame and geared to the driving-shaft and each provided with a sprocket-wheel near its top and bottom and with a brace-wheel about its middle, a series of shafts A', vertically journaled in front of the shafts B', and each having a sprocket-wheel near its top and bottom, sprocket-chains engaging the sprocket-wheels on the shafts B' and A' in pairs, a series of rods pivotally secured vertically on said chains and each having a number of fingers rigidly secured thereto, an arm fixed on the lower end of each of said rods and at an angle to the fingers thereon and having a roller on its free end, the rails $c^4$, located on the forward part of the main frame to form guideways for said rollers, substantially as described.

2. The combination with a wheeled main frame provided with a stalk-cutting mechanism and having its rear portion divided, of a driving-shaft journaled on the main frame, rearwardly-extending hangers for the traction-wheels, secured on the driving-shaft near its ends, upright standards on the rear portion of said hangers and means to incline said standards, a series of shafts B', vertically journaled on the main frame and geared to the driving-shaft and each provided with a sprocket-wheel near its top and bottom, a series of shafts A', vertically journaled in front of the shafts B', and each having a sprocket-wheel near its top and bottom, sprocket-chains engaging the sprocket-wheels on the shafts B' and A' in pairs, a series of rods pivotally secured vertically on said chains and each having a number of fingers rigidly secured thereto, an arm fixed on the lower end of each of said rods and at an angle to the fingers thereon and having a roller on its free end, the rails $c^4$, $c^{11}$ located as set forth to form guideways for said rollers, the sections $H^2$, movably located in the rear part of the main frame and adapted to close the divided portion thereof, and a mechanism to retract and extend said sections, substantially as described.

3. The combination with a wheeled main frame provided with a stalk-cutting mechanism, of a driving-shaft journaled on the main frame, a series of vertical shafts B', journaled on the main frame and geared to the driving-shaft and each having a sprocket-wheel near its top and bottom, a series of shafts A', vertically journaled in front of the shafts B', and each having a sprocket-wheel near its top and bottom, sprocket-chains engaging the sprocket-wheels on the shafts B' and A' in pairs, the shafts $B^2$, and $B^3$, vertically journaled to the rear of the shafts B', and each provided with sprocket-wheels near its top and bottom, the auxiliary shaft H, geared to the shafts $B^2$, and adapted to be thrown into gear with the driving-shaft, sprocket-chains engaging the wheels on the shafts B', and A', in pairs and on the shafts $B^2$, and $B^3$, in groups, rails $c^4$, forming guideways as set forth, a series of rods pivotally secured vertically on the chains and each having a number of fingers rigidly secured thereto, an arm fixed on the lower end of each of said rods and at an angle to the fingers thereon and having a roller on its free end adapted to operate between the rails $c^4$, and to bring and hold the fingers into action at the desired points, substantially as described.

ANDREW J. CROPP.

Witnesses:
CHAS. C. TILLMAN,
E. A. DUGGAN.